United States Patent
Kim

(10) Patent No.: US 9,156,352 B2
(45) Date of Patent: Oct. 13, 2015

(54) DRIVING ASSISTANT SYSTEM AND METHOD HAVING WARNING FUNCTION FOR RISK LEVEL

(75) Inventor: Sin Gu Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 708 days.

(21) Appl. No.: 13/402,253

(22) Filed: Feb. 22, 2012

(65) Prior Publication Data
US 2013/0113910 A1 May 9, 2013

(30) Foreign Application Priority Data
Nov. 7, 2011 (KR) .......................... 10-2011-0115280

(51) Int. Cl.
*H04N 7/18* (2006.01)
*B60K 28/06* (2006.01)

(52) U.S. Cl.
CPC .............. *B60K 28/06* (2013.01); *B60K 28/066* (2013.01); *B60W 2540/22* (2013.01)

(58) Field of Classification Search
None
See application file for complete search history.

(56) References Cited

U.S. PATENT DOCUMENTS

| | | | |
|---|---|---|---|
| 2009/0091435 A1* | 4/2009 | Bolourchi | 340/435 |
| 2009/0268022 A1* | 10/2009 | Omi | 348/135 |
| 2012/0081544 A1* | 4/2012 | Wee | 348/140 |
| 2012/0212353 A1* | 8/2012 | Fung et al. | 340/905 |

FOREIGN PATENT DOCUMENTS

| | | |
|---|---|---|
| JP | 11339199 A | 12/1999 |
| JP | 2007-128267 A | 5/2007 |
| KR | 10-1999-0041629 | 6/1999 |
| KR | 20-0429524 | 10/2006 |
| KR | 10-2009-0043221 | 5/2009 |
| KR | 1020100048279 A | 5/2010 |

* cited by examiner

*Primary Examiner* — Heather Jones
(74) *Attorney, Agent, or Firm* — Mintz Levin Cohn Ferris Glovsky and Popeo, P.C.; Peter F. Corless

(57) ABSTRACT

A driving assistant system and method having a warning function for alerting a driver of a risk level, which synthetically determines a running speed of a vehicle, a driver's inattention, a road condition, and the like and provides a warning corresponding to a degree of risk (risk level) to the driver. In particular, a calculated data value corresponding to a degree of a driver's drowsy or careless status is compared to calculation values corresponding to a vehicle speed and the degree of risk of a road to predetermined reference values corresponding to the output values and outputs at least one warning message alerting a driver of risk levels according to the comparison result.

12 Claims, 4 Drawing Sheets

| CLASSIFICATION | LEVEL 1 | LEVEL 2 | LEVEL 3 (DANGER) | OTHERS |
|---|---|---|---|---|
| A: WIRELESS DRIVING DETERMINATION: CLOSE EYE, DURATION OF DEVIATION OF FACE DIRECTION AT CONSTANT ANGLE (±20 DEGREES) | 1.2 SEC OR MORE | 2 SEC OR MORE | 2 SEC OR MORE | REFERENCE VALUES IS SET TO TURNING VALUE AND RESETTABLE |
| B: CRITERION OF DETERMINATION DISTANCE IN ROAD RISK: CURVE ROAD, OBSTACLE, UNDER CONSTRUCTION, REDUCTION IN ROAD WIDTH | 250M OR MORE | BELOW 200M | BELOW 100M | |
| C: NIGHT AND DAY : ILLUMINATION SENSOR SENSING | DAY | NIGHT | NIGHT | |

Fig.3

| WARNING LEVEL CLASSIFICATION | | |
|---|---|---|
| CLASSIFICATION | WARNING CONDITIONS | |
| LEVEL 1 | A-1 LEVEL | DISPLAY WARING |
| | A-1 LEVEL-e-1LEVEL | DISPLAY WARING |
| LEVEL 2 | A-2 LEVEL | DISPLAY WARING+BUZZER 1 LEVEL WARNING |
| | A-2 LEVEL-e-1LEVEL/B-2LEVEL | DISPLAY WARING+BUZZER 1 LEVEL WARNING |
| LEVEL 3 | A-3 LEVEL | DISPLAY WARING+BUZZER 1 LEVEL WARNING+WHEEL VIBRATION (OTHERS) |
| | A-3LEVEL-e-2 LEVEL/B-3 LEVEL/C-2LEVEL/C-3LEVEL | DISPLAY WARING+BUZZER 1 LEVEL WARNING+WHEEL VIBRATION (OTHERS) |
| | A-2LEVEL-e-3 LEVEL/C-2LEVEL/C-3LEVEL | DISPLAY WARING+BUZZER 1 LEVEL WARNING+WHEEL VIBRATION (OTHERS) |

Fig.4

DRIVING ASSISTANT SYSTEM AND METHOD HAVING WARNING FUNCTION FOR RISK LEVEL

CROSS-REFERENCES TO RELATED APPLICATIONS

This application claims priority to Korean patent application No. 10-2011-0115280 filed on Nov. 7, 2011, the disclosure of which is hereby incorporated in its entirety by reference.

BACKGROUND OF THE INVENTION

1. Field of the Invention

The present invention relates to technology for warning a driver of dangerous conditions while driving, and more particularly, to a driving assistant system and method having a warning function for identifying a risk level, which synthetically determines a running speed of a vehicle, a driver's inattention (how much attention the driver is paying to the road), a road condition, and the like and provides a warning corresponding to a degree of risk to the driver.

2. Description of the Related Art

With of the increase in the use of automobiles which have become necessities in modern society, occurrence of traffic accidents has also increased rapidly. Traffic accidents can occur for many different reasons, among them being driver negligence and unexpected risks due to the road conditions. Among these factors, a couple of the most common causes are speeding or drowsiness. These conditions can cause serious accidents leading to personal injury or even death.

A of 2.5 million traffic accidents occurring within one year by a national highway traffic safety administration (NHTSA) shows that 25 to 56% of all traffic accidents are caused by a driver's careless driving. The three most significant factors causing this carelessness are sight negligence, mental concentration negligence, and drowsiness.

In an effort to solve the problem, major automobile manufacturers continue to develop various new systems for assisting driver's in safe vehicular operation and apply these new systems to the vehicles accordingly. Some manufactures have developed techniques which are able to determine when the driver is becoming drowsy by sensing a driver's reactions and movement using a camera or monitoring the driver's pulse through a sensor, and display a warning lamp on a dash board to recommend that the driver stop to take a break for a while when the driver's drowsy or is acting in a careless manor.

However, drowsy or careless driving is just as likely to cause as serious of traffic accidents as those caused by drunk driving. Therefore, research on systems for synthetically determining a driver's consciousness and taking aggressive and immediate action according to a determination result beyond simple recommendation of taking a break is required.

SUMMARY OF THE INVENTION

Various aspects of the present invention have been made in view of the above problems, and provide a driving assistant system and method having a warning function for alerting the driver of a degree of risk, which synthetically determines a running speed of a vehicle, a driver's inattention, a road condition, and the like and provides a warning corresponding to a degree of risk to the driver.

According to an aspect of the present invention, a driving assistant system having a warning function for alerting the driver of a degree of risk (hereinafter known as "a risk level") is provided. The system may include: a driving status monitoring unit configured to monitor a driver's drowsy or careless driving; a vehicle speed sensor configured to detect a running speed of a vehicle; a road information providing apparatus configured to provide road information; a reference data storage unit configured to store reference values for a risk level using output information from the driving status monitoring unit, the vehicle speed sensor, and the road information providing apparatus as a factor; a warning output unit configured to output at least one warning message corresponding to a driver's degree of risk according to a predetermined control data; and a control unit configured to compare and calculate the output information of the driving status monitoring unit, the vehicle speed sensor, and the road information providing apparatus based on information stored in the reference data storage unit to determine a degree of driving risk and control the warning output unit according to the degree of driving risk to output a warning data corresponding to the degree of driving risk.

The driving status monitoring unit may include a camera configured to photograph the driver's face, and a controller configured to analyze image information photographed by the camera and output status information corresponding to the driver's status based on an analytical result.

The warning output unit may include at least one component selected from the group consisting of a display device, a speaker, a wheel controller, and a haptic sheet. The control unit may be configured to control the warning output unit to selectively drive any one of the components of the warning output unit according to the degree of driving risk.

The road information providing apparatus may be configured of or embodied within any one of a navigation apparatus or a lane departure warning system (LDWS). Along those same lines, the control unit may be integrally embodied within an electronic control unit (ECC).

According to another aspect of the present invention, a driving assistant method having a warning function for assessing and alerting a driver of a risk level, which determines and warns the driver of a degree of risk based on a preset reference value, is provided. The method may include: outputting status information for a degree of a driver's drowsy or careless state as a data value which corresponds to this degree of drowsiness or carelessness; detecting a speed of a vehicle; determining a degree of risk of a road and outputting a calculation value corresponding to a degree of risk of the road; comparing output values received from outputting the status information, detecting the speed of a vehicle, and determining the degree of risk of a road to predetermined reference values set with respect to the output values; and outputting at least one warning message according to the comparison.

Comparing the output values may include simultaneously comparing and calculating the output values received from outputting the status information, detecting the speed of a vehicle, and determining the degree of risk of a road to the predetermined reference values set with respect to the output values.

Comparing the output values may also or alternatively include sequentially comparing and calculating the output values received from outputting the status information, detecting the speed of a vehicle, and determining the degree of risk of a road to the predetermined reference values set with respect to the output values according to a priority.

In some embodiments of the present invention outputting the warning message may be performed using at least one selected from the group consisting of a method of turning on a warning lamp through a display, a method of outputting a voice message through a speaker, and a method of giving a vibration through a wheel vibration or a haptic sheet vibration.

Furthermore, comparing the output values may include comparing and calculating the output values from outputting the status information first, then to the output values from detecting the speed of a vehicle second, and then to the output values from determining the degree of risk of a road to the predetermined reference values set with respect to the output values, respectively.

According to the exemplary embodiment of the present invention, it is possible to subdivide a risk status of a driver step by step by synthetically considering a plurality of factors related to the degree of driving risk and provide an appropriate warning corresponding to the degree for each risk level.

Therefore, it is possible for the driver to take action depending upon the degree of risk. That is, it is possible for the driver to recognize the degree of risk rapidly and take immediate action, thereby preventing the driver from acting in a manor which could foreseeably cause an accident. Additionally, because the illustrative embodiment also assesses mild risks and draws the driver's attention to these risks, the driver can also be notified in advance before the risks become too great.

The system and methods of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 3 is a view illustrating an operation of subdividing a degree of driving risk according to an exemplary embodiment of the present invention.

FIG. 4 is a view illustrating a warning method for each degree of driving risk.

DETAILED DESCRIPTION

Figure 1:
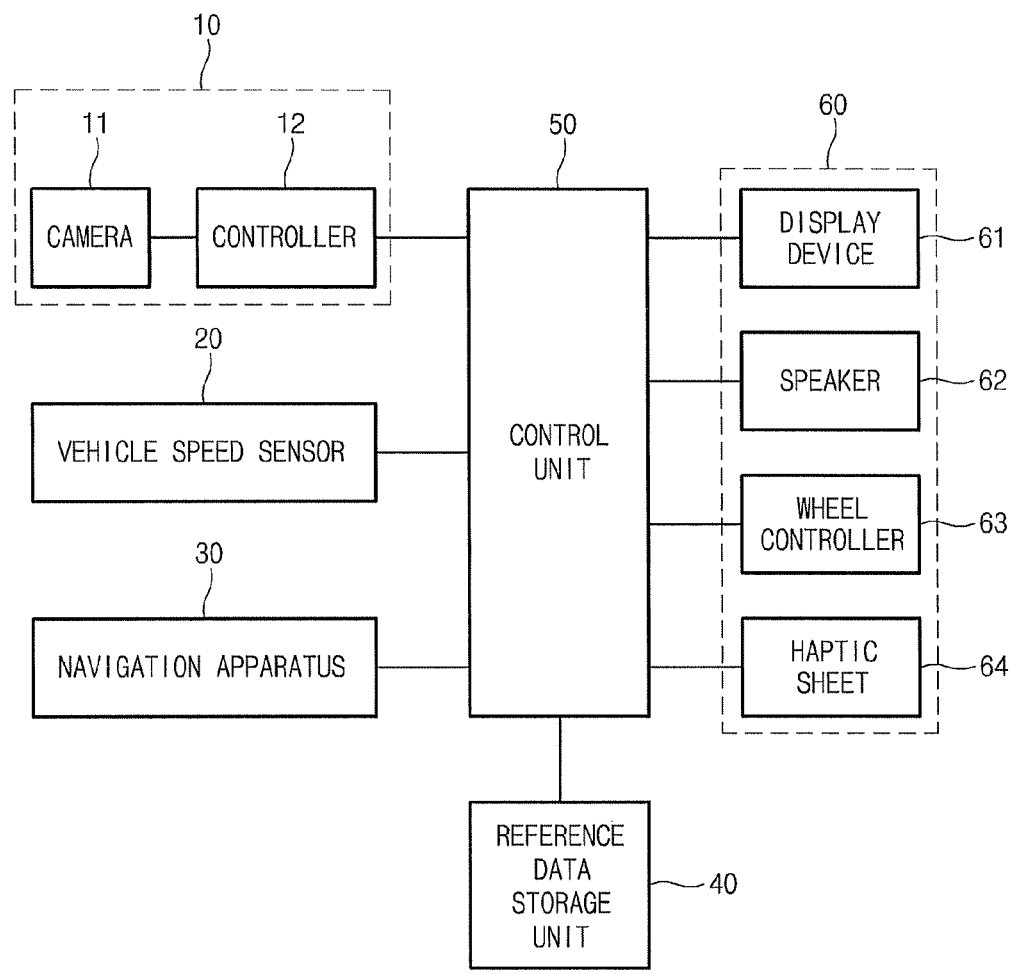
FIG. 1 is a functional block diagram illustrating a driving assistant system having a warning function for a risk level according to an exemplary embodiment of the present invention.

Reference will now be made in detail to various embodiments of the present invention(s), examples of which are illustrated in the accompanying drawings and described below. Like reference numerals in the drawings denote like elements. When it is determined that detailed description of a configuration or a function in the related disclosure interrupts understandings of embodiments in description of the embodiments of the invention, the detailed description will be omitted.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

FIG. 1 is a functional block diagram illustrating a driving assistant system having a warning function for each risk level according to an exemplary embodiment of the present invention. In FIG. 1, a driving status monitoring unit 10 is configured to monitor a driver's drowsy or careless driving. A camera 11 and a controller 12 within the driving status monitoring unit 10 are configured to output status information corresponding to the driver's status based on image information photographed by the camera 11.

A vehicle speed sensor 20 is configured to detect a running speed of a vehicle, and a navigation apparatus 30 is configured to provide road information.

A reference data storage unit 40 is configured to store reference values related to degrees of risk based on output information from the driving status monitoring unit 10, the vehicle speed sensor 20, and a navigation apparatus 30. A control unit 50 is configured to calculate and compare the output information of the driving status monitoring unit 10, the vehicle speed sensor 20, and the navigation apparatus 30 to determine a degree of driving risk based on information stored in the reference data storage unit 40 and output control data corresponding to each degree of driving risk.

A warning output unit 60 is configured to output various warning messages corresponding to a degree of risk of the driver according to preset control data from the control unit 50. The warning output unit 60 may include a display device 61 in which a driving warning lamp is built therein, a speaker 62, a wheel controller 63 configured to control a vibration of a wheel, and a haptic sheet 64 configured so that a vibration device is built therein and configured to transmit a vibration to the driver's seat according to predetermined control data.

In some embodiments of the present invention, the control unit 50 may be integrally embodied within an electronic control unit (ECC).

Figure 2:
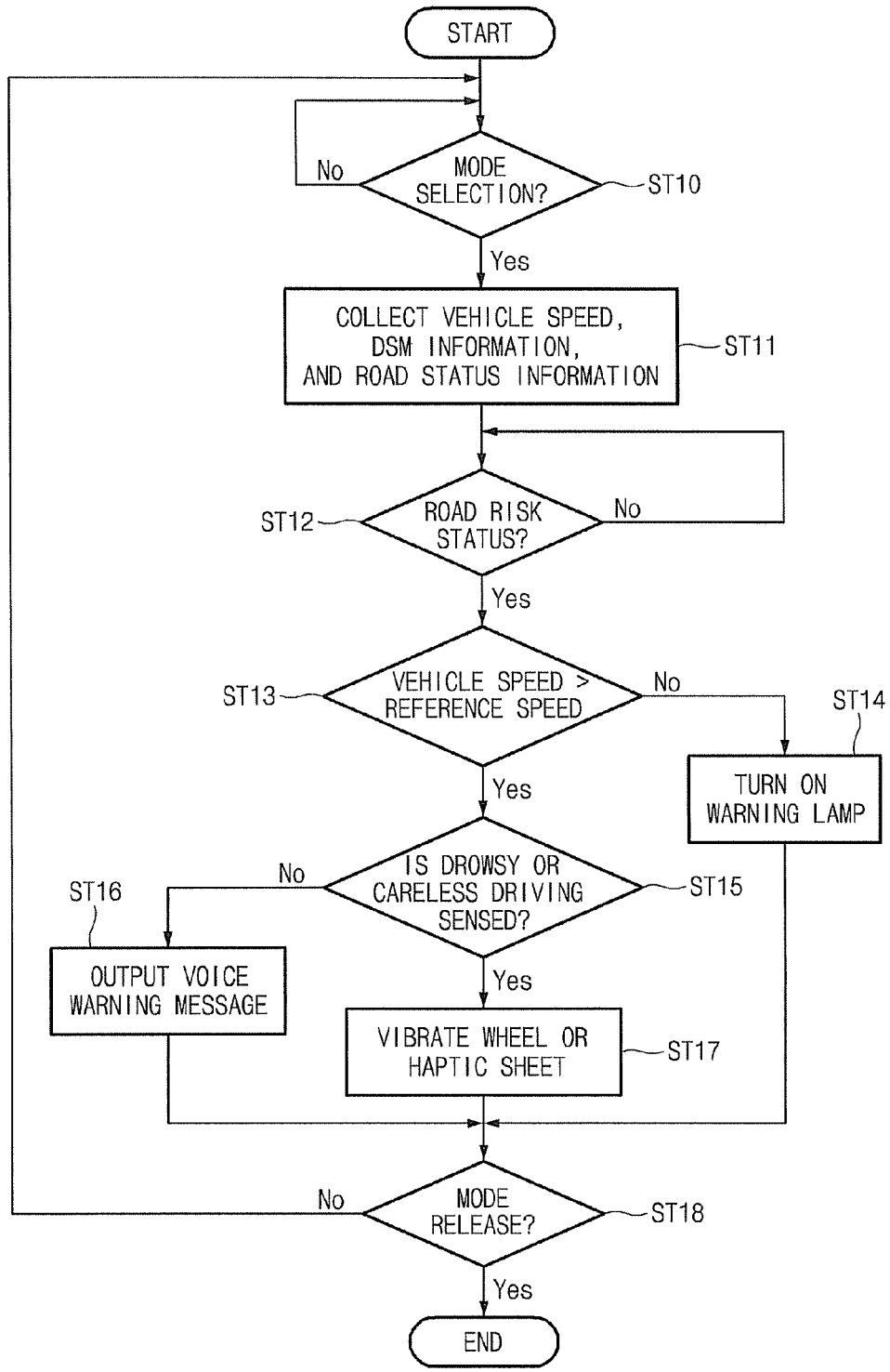
FIG. 2 is a sequence diagram illustrating an operation of the driving assistant system having the configuration of FIG. 1.

Next, an operation of the driving assistant system having the configuration will now be described with reference to a sequence diagram of FIG. 2.

The driver may activate the illustrative embodiment of the present invention by pushing a button included in the vehicle to select certain driving assistant functions according to the exemplary embodiment of the present invention. Doing so allows the system to get the driver's attention when the system has determined that the driver's physical appearance has changed or that a scheduled stop for a long-distance drive on a highway is needed, for example (ST10). Alternatively, the exemplary embodiment may be implemented to automatically execute the driving assistant system when the vehicle is started without any action by the driver.

When the driving assistant function according to the exemplary embodiment is selected, the control unit 50 collects the driver's physical status information, speed information of the vehicle, and road information for the road the vehicle is currently traveling on from the driving status monitoring unit 10, the vehicle speed sensor 20, and the navigation apparatus 30, respectively (ST11).

Meanwhile, a reference value for each piece of information applied from each input apparatus is set in the reference data storage unit 40. The reference value may be set to a value preset during manufacturing of the vehicle. Alternatively, the reference value may be configured to be reset based on an average value during a predetermined period of time or an empirical value cumulatively calculated, by the control unit 50.

The control unit 50 continuously monitors the information applied from the driving status monitoring unit 10, the vehicle speed sensor 20, and the navigation apparatus 30 and determines whether the degree of risk for the upcoming sections of road, such as a steep slope, construction, or a sharp curve having a radius of curvature is detected in the project line of travel (ST12).

When the degree of risk of the upcoming sections of road is sensed as a monitoring result of step ST12, the control unit 50 checks a current speed of the vehicle through the output value of the vehicle speed sensor 20 (ST13). Upon determining that the current speed of the vehicle is not over a preset reference speed step ST13, the control unit 50 determines the current status to be at a risk level 1 and turns on a warning lamp built in the display device 61 (ST14), thereby calling the driver's attention.

When the current speed of the vehicle is over the preset reference speed at ST13, the control unit 50 determines whether the driver's physical status is drowsy or careless based on the information applied from the driving status monitoring unit 10 (ST15). When it is determined that the driver is not drowsy or careless, the control unit 50 determines the current status to by at a risk level 2 and outputs a warning message such as a buzzer sound through the speaker 62 (ST16).

When it is determined that the driver's physical status is not in a normal state in step S15, the control unit 50 determines the current status to be at a risk level 3 and controls the wheel controller 63 or the haptic sheet 64 to enable the vehicle to vibrate for a predetermined period time or to vibrate the driver's seat, thereby outputting a strong warning message to allow the driver to regain consciousness (S17).

Meanwhile, when the driver determines that the driving assistant function is not necessary any more, the driver may terminate the function of the driving assistant function according to the exemplary embodiment any time through a simple button selection method (ST18).

Advantageously, according to the exemplary embodiment, it is possible to subdivide the driver's risk status according to degree of risk by synthetically considering a plurality of factors related to the degree of driving risk and provide an appropriate warning response corresponding to the degree of risk for each risk level.

FIG. 3 illustrates subdivision of the degree of driving risk in which an illuminance sensor is additionally configured in addition to the driving status monitoring unit 10, the vehicle speed sensor 20, and the navigation apparatus 30. Values output from the components are compared to the preset reference values for the risk levels, and the degree of driving risk is subdivided according to a comparison result.

With respect to the degree of driving risk, a warning method for each level is predetermined and FIG. 4 illustrates the warning method according to each degree of driving risk. That is, according to the above configuration, it is possible to further subdivide the degree of driving risk and provide a warning method suitable to each degree of driving risk.

The present invention is not limited to the exemplary embodiment. The above-described exemplary embodiment may be modified without departing from the spirit and scope of the present invention. For example, the system may be configured to include a lane departure warning system (LDWS) in place of the navigation apparatus 30 and for the control unit 50 to sense the road risk based on output data of the LDWS.

The exemplary embodiment has been illustrated that the process ST12 of the degree of risk of a road, the process ST13 of determining whether or not the current speed is over the reference value, and the process ST15 of sensing the driver's drowsy or careless driving are sequentially performed, but three processes collectively processed simultaneously by one processor.

In the above illustrative embodiment, the control unit may be embodied as a controller or processor configured to execute the above processes. Furthermore, the control logic within the controller or processor of the present invention may be embodied as non-transitory computer readable media on a computer readable medium containing executable program instructions executed by the processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A driving assistant system having a warning function for alerting a driver of a risk level, the system comprising:
   a driving status monitoring unit configured to monitor a driver's drowsy or careless driving;
   a vehicle speed sensor configured to detect a running speed of a vehicle;
   a road information providing apparatus configured to provide road information;
   a reference data storage unit configured to store reference values for a plurality of risk levels using output information from the driving status monitoring unit, the vehicle speed sensor, and the road information providing apparatus as a factor;
   a warning output unit configured to output at least one warning message corresponding to a driver's risk status according to a predetermined control data; and
   a control unit configured to compare and calculate the output information of the driving status monitoring unit, the vehicle speed sensor, and the road information providing apparatus based on information stored in the reference data storage unit to determine a plurality of driving risk levels and control the warning output unit according to the different levels of driving risk to output a different warning data which corresponds to each driving risk level,
   wherein the control unit is configured to compare the output information of the driving status monitoring unit with first reference data, compare the output information of the vehicle speed sensor with second reference data, and compare the output information of the road information providing apparatus with third reference data, and
   wherein a low risk level is determined when one of the conditions of the first reference data to the third reference data is satisfied and a high risk level is determined when all of the conditions of the first reference, data to the third reference data are satisfied.

2. The system of claim 1, wherein the driving status monitoring unit includes:
   a camera configured to photograph the driver's face; and
   a controller configured to analyze image information photographed by the camera and output status information corresponding to the driver's status based on an analysis result.

3. The system of claim 1, wherein the warning output unit includes at least one component selected from the group consisting of a display device, a speaker, a wheel controller, and a haptic sheet, and
   the control unit is configured to control the warning output unit to selectively drive any one of the components of the warning output unit according to the degree of driving risk.

4. The system of claim 1, wherein the road information providing apparatus is configured as a navigation apparatus.

5. The system of claim 1, wherein the road information providing apparatus is configured as a lane departure warning system (LDWS).

6. The system of claim 1, wherein the control unit is integrally embodied within an electronic control unit (ECC).

7. A driving assistant method of performing warning function, the method comprising:
   outputting, by a first unit, status information for a degree of a driver's drowsiness or carelessness as a data value;
   detecting, by a sensor, a speed of a vehicle;
   determining, by a second unit, a plurality of risk levels of a road and outputting a calculation value corresponding to each level of risk of the road;
   comparing, by a control unit, output values from the outputted status information, the detected speed of the vehicle, and the determined risk level of a road to predetermined reference values set with respect to the output values, wherein the predetermined reference values include first reference data, second reference data, and third reference;
   comparing, by the control unit, the status information with the first reference data;
   comparing, by the control unit, the speed of the vehicle with the second reference data;
   comparing, by the control unit, road information with the third reference data;
   outputting, by the control unit, a different warning message for each risk level according to a comparison result of the comparing the output values; and
   alerting, by the control unit, a driver of a risk level based on current driving conditions associated with the preset reference value,
   wherein a low risk level is determined when one of the conditions of the first reference data to the third reference data is satisfied and a high risk level is determined when all of the conditions of the first reference data to the third reference data are satisfied.

8. The method of claim 7, wherein the comparing the output values includes simultaneously comparing and calculating the output values from outputting the status information, detecting the speed of a vehicle, and determining the risk status of a road to the predetermined reference values set with respect to the output values.

9. The method of claim 7, wherein the comparing the output values includes sequentially comparing and calculating the output values from outputting the status information, detecting the speed of a vehicle, and determining the risk status of a road to the predetermined reference values set with respect to the output values according to a priority.

10. The method of claim 9, wherein the comparing the output values include comparing and calculating the output values from outputting the status information first, then to the output values from detecting the speed of a vehicle second, and then to the output values from determining the degree of risk of a road to the predetermined reference values set with respect to the output values, respectively.

11. The method of claim 7, wherein the outputting the warning message is performed using at least one selected from the group consisting of a method of turning on a warning lamp through a display, a method of outputting a voice message through a speak, and a method of giving a vibration through a wheel vibration or a haptic sheet vibration.

12. A non-transitory computer readable medium containing program instruction executed by a controller, the non-transitory computer readable medium comprising:
   program instructions that output status information for a degree of a driver's drowsiness or carelessness as a data value;
   program instructions that detect a speed of a vehicle using a sensor;
   program instructions that determine a plurality of risk levels of a road and outputting a calculation value corresponding to each level of risk of the road;
   program instructions that compare output values from the outputted status information, the detected speed of the vehicle, and the determined risk level of a road to predetermined reference values set with respect to the output values, wherein the predetermined reference values include first reference data, second reference data, and third reference;
   program instructions that compare the status information with the first reference data;
   program instructions that compare the speed of the vehicle with the second reference data;
   program instructions that compare road information with the third reference data;
   program instructions that output a different warning message for each risk level according to a comparison result of the comparing the output values; and
   program instructions that alert the driver of a risk level based on current driving conditions associated with the preset reference value,
   wherein a low risk level is determined when one of the conditions of the first reference data to the third reference data is satisfied and a high risk level is determined when ail of the conditions of the first reference data to the third reference data are satisfied.

* * * * *